United States Patent
Grammel et al.

(10) Patent No.: US 11,240,573 B2
(45) Date of Patent: *Feb. 1, 2022

(54) METHODS AND APPARATUS FOR CONSISTENCY CHECK FOR DISAGGREGATED DENSE WAVELENGTH-DIVISION MULTIPLEXING (DWDM) SYSTEMS

(71) Applicant: Juniper Networks, Inc., Sunnyvale, CA (US)

(72) Inventors: Gert Grammel, Ditzingen (DE); Marcel Wiget, Zug (CH)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/069,157

(22) Filed: Oct. 13, 2020

(65) Prior Publication Data
US 2021/0044878 A1 Feb. 11, 2021

Related U.S. Application Data

(63) Continuation of application No. 15/895,265, filed on Feb. 13, 2018, now Pat. No. 10,841,670.

(51) Int. Cl.
*H04Q 11/00* (2006.01)
*H04B 10/079* (2013.01)
(Continued)

(52) U.S. Cl.
CPC ..... *H04Q 11/0005* (2013.01); *H04B 10/0795* (2013.01); *H04B 10/25* (2013.01);
(Continued)

(58) Field of Classification Search
CPC ............ H04Q 11/0005; H04B 10/0795; H04J 14/0272
See application file for complete search history.

(56) References Cited

U.S. PATENT DOCUMENTS

| | | | | |
|---|---|---|---|---|
| 6,976,087 B1 * | 12/2005 | Westfall | ............. | H04L 43/0852 370/238 |
| 7,756,027 B1 * | 7/2010 | Reddy | ................ | H04L 41/0806 370/230 |

(Continued)

FOREIGN PATENT DOCUMENTS

| | | |
|---|---|---|
| CN | 101917646 A | 12/2010 |
| CN | 102202246 A | 9/2011 |

(Continued)

OTHER PUBLICATIONS

Extended European Search Report for European Application No. 18209369.0 dated Jul. 9, 2019, 8 pages.
(Continued)

*Primary Examiner* — Nathan M Cors
(74) *Attorney, Agent, or Firm* — Cooley LLP

(57) ABSTRACT

An apparatus includes a first communication interface configured to be communicatively coupled, via an optical line, to a network device that is disposed in an optical network using wavelength division multiplexing (WDM). The apparatus also includes a second communication interface configured to be communicatively coupled to a router via an Ethernet connection. The apparatus also includes a signal generator operatively coupled to the first communication interface and the second communication interface. The signal generator is configured to generate an Ethernet signal representing at least one attribute of the optical line between the first communication interface and the network device. The second communication interface is configured to transmit the Ethernet signal to the router.

20 Claims, 3 Drawing Sheets

(51) Int. Cl.
*H04J 14/02* (2006.01)
*H04B 10/25* (2013.01)
*H04L 29/06* (2006.01)

(52) U.S. Cl.
CPC ...... *H04J 14/0212* (2013.01); *H04J 14/0227* (2013.01); *H04L 63/0428* (2013.01); *H04Q 11/0062* (2013.01); *H04Q 11/0067* (2013.01); *H04Q 2011/0016* (2013.01); *H04Q 2011/0073* (2013.01); *H04Q 2011/0084* (2013.01)

(56) References Cited

U.S. PATENT DOCUMENTS

| | | | | |
|---|---|---|---|---|
| 8,989,199 | B1* | 3/2015 | Sella | H04L 45/507 370/409 |
| 9,590,847 | B2 | 3/2017 | Hajduczenia et al. | |
| 9,686,598 | B2 | 6/2017 | Siddhaye et al. | |
| 10,841,670 | B2* | 11/2020 | Grammel | H04J 14/0227 |
| 2002/0080475 | A1* | 6/2002 | Cornelius | H04B 10/07955 359/341.41 |
| 2004/0028409 | A1* | 2/2004 | Kim | H04L 63/0272 398/71 |
| 2012/0275784 | A1 | 11/2012 | Soto et al. | |
| 2013/0279909 | A1* | 10/2013 | Srinivas | H04Q 11/0062 398/58 |
| 2016/0134527 | A1* | 5/2016 | Kwak | H04L 45/04 370/352 |
| 2016/0248623 | A1* | 8/2016 | Matsuura | H04B 10/038 |
| 2018/0316435 | A1 | 11/2018 | Remein et al. | |

FOREIGN PATENT DOCUMENTS

| | | |
|---|---|---|
| CN | 104539470 A | 4/2015 |
| CN | 104604182 A | 5/2015 |
| CN | 206135949 U | 4/2017 |
| CN | 106788690 A | 5/2017 |

OTHER PUBLICATIONS

First Office Action for Chinese Application No. 201811448006.X, dated Apr. 25, 2021, 11 pages.

Office Action for European Application No. 18209369.0 dated Oct. 22, 2021, 7 pages.

* cited by examiner

METHODS AND APPARATUS FOR CONSISTENCY CHECK FOR DISAGGREGATED DENSE WAVELENGTH-DIVISION MULTIPLEXING (DWDM) SYSTEMS

CROSS-REFERENCE TO RELATED APPLICATION

This application is a continuation of U.S. patent application Ser. No. 15/895,265, filed Feb. 13, 2018, now U.S. Pat. No. 10,841,670, and entitled "Methods and Apparatus for Consistency Check In Disaggregated Dense Wavelength-Division Multiplexing (DWDM) Systems", the disclosure of which is incorporated herein by reference in its entirety.

FIELD

One or more embodiments relate to apparatus and methods of consistency check for disaggregated dense wavelength-division multiplexing (WDWM) systems.

BACKGROUND

In a disaggregated dense wavelength division multiplexing (DWDM) system, a pair of DWDM-capable devices act as a Modem line between routers and switches. In some cases, these routers and switches may not be operated by the same entity. They may be also operated by management systems different from those used for the DWDM-capable devices.

Accordingly, it can be challenging for routers and switches to check whether the Modem devices are operating as desired. For example, routers usually rely on encryption provided by the Modem devices to exchange packets. Misconfiguration of the encryption may occur and the routers may not be aware of the situation, however, because the impairment is usually not detectable or observable on the routers.

In some cases, routers apply Operations, Administration, and Maintenance (OAM) Mechanisms, such as ping, Bidirectional Forwarding Detection (BFD), and Ethernet OAM (IEEE 802.3ah), in an attempt to check the line condition. Line systems may use G.709 overhead and physical layer measurements to gauge the state of the communication carrier. No defined way exists, however, to transport physical layer status information obtained by G.709 overhead or physical layer measures in Ethernet.

SUMMARY

Some embodiments described herein relate generally to consistency check in an optical network, and, in particular, to methods and apparatus for determining the consistency of an optical line system using link-lay discovery protocol (LLDP) signals exchanged between routers and the optical line system. In some embodiments, an apparatus includes a first communication interface configured to be communicatively coupled, via an optical line, to a network device that is disposed in an optical network using a wavelength division multiplexing (WDM). The apparatus also includes a second communication interface configured to be communicatively coupled to a router via an Ethernet connection. The apparatus also includes a signal generator operatively coupled to the first communication interface and the second communication interface. The signal generator is configured to generate an Ethernet signal representing at least one attribute of the optical line between the first communication interface and the network device. The second communication interface is configured to transmit the Ethernet signal to the router.

In some embodiments, a method includes receiving, at a router, an Ethernet signal from a first network device that is in an optical network using wavelength-division multiplexing (WDM) scheme and that is configured to communicate with a second network device via an optical line. The Ethernet signal represents at least one attribute of the optical line. The method also includes adjusting an operation of the router in response to receiving the Ethernet signal.

In some embodiments, a system includes a first network switch and a second network switch communicatively coupled to the first network switch via an optical line using wavelength division multiplexing (WDM). The system also includes a router communicatively coupled to the first network switch via an Ethernet connection. The first network switch is configured to generate a link-layer discovery protocol (LLDP) signal representing an encryption status of the optical line between the first network device and the second network device. In response to receiving the LLDP signal indicating that encryption is disabled on the first network device, the router shuts down at least one communication interface on the router.

BRIEF DESCRIPTION OF THE DRAWINGS

The skilled artisan will understand that the drawings primarily are for illustration purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

In some embodiments, an apparatus includes a first communication interface configured to be communicatively coupled, via an optical line, to a network device that is disposed in an optical network using wavelength division multiplexing (WDM) connection. The apparatus also includes a second communication interface configured to be communicatively coupled to a router via an Ethernet connection. The apparatus also includes a signal generator operatively coupled to the first communication interface and the second communication interface. The signal generator is configured to generate an Ethernet signal representing at least one attribute of the optical line between the first communication interface and the network device. The second communication interface is configured to transmit the Ethernet signal to the router.

In some embodiments, the network device includes a network switch. In some embodiments, the network device includes a modem.

In some embodiments, the signal generator is configured to generate the Ethernet signal including a link-layer discovery protocol (LLDP) signal representing an encryption status of the optical line. In some embodiments, the signal generator is configured to generate the Ethernet signal including an LLDP signal representing available bandwidth in the optical line. In some embodiments, the signal generator is configured to generate the Ethernet signal including an LLDP signal representing expected latency in the optical line.

In some embodiments, the optical line includes a primary route and a secondary route, and the Ethernet signal includes an LLDP signal representing a selection of route between the primary route and the second route used for optical communication between the first communication interface and the network device.

In some embodiments, the second communication interface is configured to receive a second Ethernet signal transmitted by the router, the second Ethernet signal representing a status of port usage in the router. In some embodiments, the second communication interface is configured to receive a second Ethernet signal transmitted by the router, the second Ethernet signal representing timing of the router.

Figure 1:
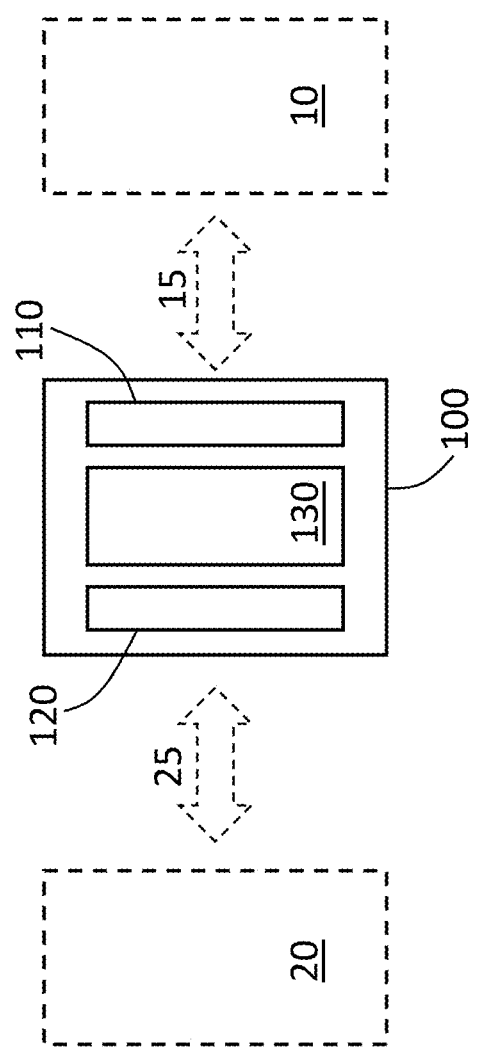
FIG. 1 shows a schematic of an apparatus for checking consistency of an optical line system, according to an embodiment.

FIG. 1 shows a schematic of an apparatus 100 for checking consistency of an optical line system, according to an embodiment. The apparatus 100 includes a first communication interface 110 configured to be communicatively coupled, via an optical line 15 (e.g., an Ethernet medium 15), to a network device 10 that is disposed in an optical network using a wavelength division multiplexing (WDM). The apparatus 100 also includes a second communication interface 120 configured to be communicatively coupled to a router 20 via an Ethernet connection 25. The apparatus 100 further includes a signal generator 130 operatively coupled to the first communication interface 110 and the second communication interface 120. The signal generator 130 is configured to generate an Ethernet signal representing at least one attribute of the optical line 15 between the first communication interface 110 and the network device 10. The second communication interface 120 is configured to transmit the Ethernet signal to the router 20. In this manner, the router 20 can acquire information about the condition (e.g., consistency) of the optical line 15.

In some deployments, the network device 10 includes a network switch. In some deployments, the network device 10 includes a modem. In some embodiments, the network device 10 and the apparatus 100 can be the same type of device. Therefore, the network device 10 can include any of the options described above for the apparatus 100.

Figure 2:
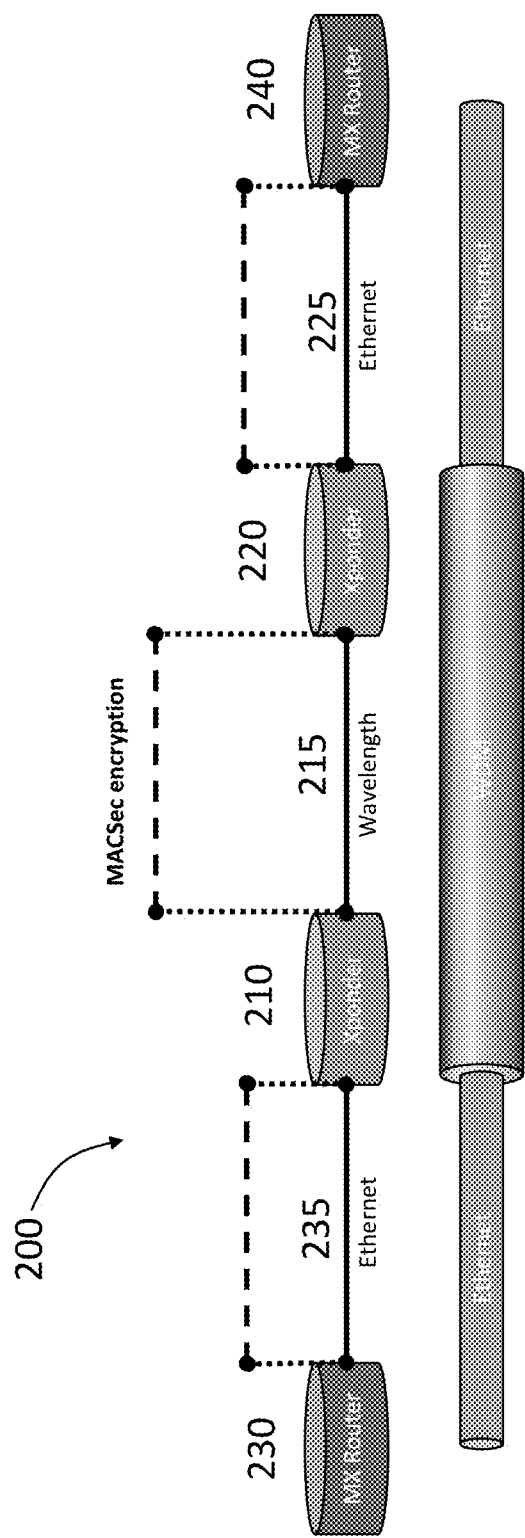
FIG. 2 shows a schematic of a system where the apparatus shown in FIG. 1 can be used to check the consistency of optical line systems, according to an embodiment.

FIG. 2 shows a schematic of a system 200 (e.g. an optical line system) where the apparatus 100 shown in FIG. 1 and described above can be used to check the consistency. The system 200 includes a first network device 210 and a second network device 220 communicatively coupled by an optical line 215 (e.g., an Ethernet medium). The first network device 210 is communicatively coupled to a first router 230 via a first Ethernet connection 235, and the second network device 220 is communicatively coupled to a second router 240 via a second Ethernet connection 225.

Each of the first network device 210 and the second network device 220 can be substantially similar to the apparatus 100 shown in FIG. 1 and described herein. Therefore, the first network device 210 can generate a first Ethernet signal including information about the optical line 215 and send the first Ethernet signal to the first router 230. Similarly, the second network device 220 can also generate a second Ethernet signal including information about the optical line 215 and send the second Ethernet signal to the second router 240.

In some embodiments, the first Ethernet signal can be transmitted through the optical line 215 so as to reach the second network device 220 and/or the second router 240. Similarly, the second Ethernet signal can be transmitted through the optical line 215 so as to reach the first network device 210 and/or the first router 230.

In some embodiments, the first and second Ethernet signals can include LLDP signals. In some embodiments, the first and second Ethernet signals can include ping packets. In normal operation of the system, the first router 230 can generate a normal packet (i.e. packet not for consistency checking), which is encrypted by the first network device 210 and transmitted to the second network device 220. The second network device 220 can decrypt the normal packet and send the decrypted packet to the second router 240.

For consistency checking, the first router 230 can generate a ping packet including some content (e.g., a random number generated by the first router 230) and a first checksum (e.g., SHA1). The first network device 210 then encrypts this ping packet and forwards the ping packet to the second network device 220. In contrast to normal packets, the second network device 220 decrypts only the content of the ping packet and does not decrypt the checksum. Instead, the checksum is replaced by a new checksum (referred to as a second checksum herein) based on the payload and the first checksum. The modified ping packet is then sent to the second router 240.

The second router 240 performs several tasks on the modified ping packet. First, the second router 240 calculates a new checksum (a third checksum) of the now unencrypted payload. The result should now be the checksum of the unencrypted payload sent out by the first router 230. The second router 240 also calculates another new checksum (a fourth checksum) based on payload and checksum in previous step (i.e., the third checksum).

If the modified ping packet received from the second network device 220 contains the third checksum, then it indicates that that the modified ping packet was not properly encrypted, i.e., the optical line was not properly encrypted. If, however, the modified ping packet received from the second network device 220 contains the fourth checksum, it indicates that the optical line 215 could encrypt (because the optical line 215 treats the ping packet correctly) but is not configured to do so. In a third situation, if the fourth checksum does not match the checksum produced by the second network device 220, the second router 240 can determine that the encryption is working properly in the optical line 215.

In some embodiments, the result of this check (e.g., the third and fourth checksums) can be played back to the originator (i.e., the first router 230) in the payload via a second ping packet using the same method as described above. Upon receiving the second ping packet, the first router 230 can do the same calculations as above to determine if the receiving direction is properly encrypted. Once done, because the first router 230 knows the original payload (i.e., in the first ping packet), the first router 230 can run the checksums again and compare them to what the remote end (i.e., the second router 240) sent in the second ping packet so as to determine if the sending direction worked properly.

In some embodiments, the above methods can be performed by the first network device 210 and the second network device 220. The first network device 210 and the second network device 220 can then convey the results to the corresponding routers 230 and 240 (e.g., using LLDP signals).

Figure 3:
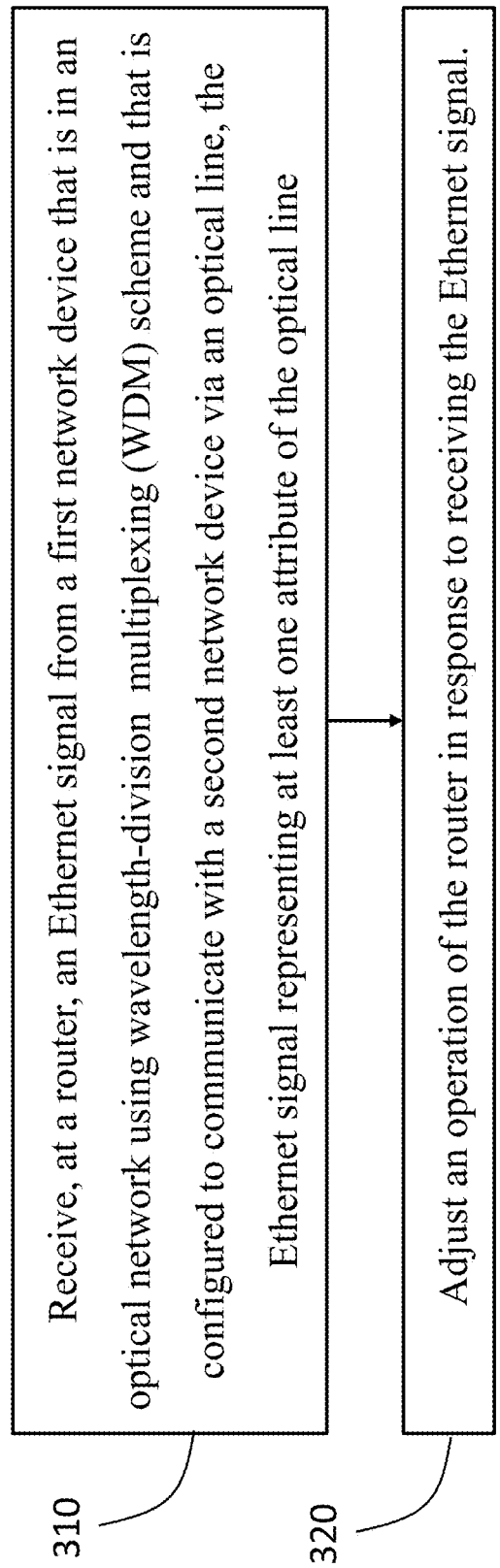
FIG. 3 illustrates a method of consistency check in an optical line system, according to an embodiment.

FIG. 3 illustrates a method 300 of consistency checking in an optical line system, according to embodiments. The method 300 incudes, at 310, receiving, at a router, an Ethernet signal from a first network device that is in an optical network using wavelength-division multiplexing (WDM) scheme and that is configured to communicate with a second network device via an optical line. The Ethernet signal represents (or includes a representation of at least one attribute of the optical line. The method 300 also includes, at 320, adjusting an operation of the router in response to receiving the Ethernet signal.

In some embodiments, the first network device includes a network switch. In some embodiments, the first network device includes a modem. In some embodiments, the Ethernet signal includes a link-layer discovery protocol (LLDP) signal representing the encryption status of the optical line. In response to receiving the LLDP signal indicating that encryption is disabled on the first network device, the router is configured to shut down at least one communication interface (i.e., stop data transmission towards the optical line).

In some embodiments, the Ethernet signal includes an LLDP signal representing available bandwidth in the optical line. In response to receiving the LLDP signal indicating a bandwidth in the optical line less than an expected value, the router can adjust a quality of service (QoS) of traffic transmitted from the router. For example, the router can reduce the amount of data transmitted towards the optical line and/or split some of the data transmission to an alternative route.

In some embodiments, the Ethernet signal includes information about the jitter level in the optical line. In response to receiving the Ethernet signal indicating the jitter level greater than a threshold value, the router can be configured to depreciate the time resource in the optical line (i.e. increase the jitter tolerance).

In some embodiments, the Ethernet signal includes an LLDP signal representing expected latency in the optical line. The latency information can be used by the router to identify the potential source of impairments in some low-latency services. The router can also use the latency information to re-balance the traffic.

In some embodiments, the method 300 can further include transmitting a second Ethernet signal to the first network device and the second Ethernet signal represents a status of the router. For example, the status of the router can include the status of port usage in the router and/or the timing and synchronization of the router.

Referring back to FIG. 1, in some embodiments, the apparatus 100 can be configured as a transponder, which can insert and/or extract packets into the optical line 15. In one example, the transponder can also have switching capability. In another example, the transponder can have no switching capability.

In some embodiments, the apparatus 100 can be configured as a network switch supporting Layer-2 switching, Layer-3 switching, and Multiprotocol Label Switching (MPLS) capabilities. In some embodiments, the apparatus 100 can be configured to offer a choice of, for example, 10 GbE, 25 GbE, 40 GbE, 50 GbE, and 100 GbE interface speeds for server and intra-fabric connectivity, providing deployment versatility and investment protection.

In some embodiments, the apparatus 100 can be configured to provide, for example, 24 or more 10/100/1000BASE-T ports with or without Power over Ethernet (PoE) (not shown in FIG. 1). In some embodiments, the apparatus 100 can include a PoE-enabled network switch configured to deliver standards-based 802.3af Class 3 PoE or standards-based 802.3at PoE+ to support networked devices such as telephones, video cameras, multiple radio IEEE 802.11n wireless LAN (WLAN) access points and video phones in converged networks.

In some embodiments, the apparatus 100 can include multiple front panel small form-factor pluggable transceiver (SFP) GbE uplink ports (not shown in FIG. 1) configured for high-speed backbone or link aggregation connections between wiring closets and upstream aggregation switches. The number of front panel SFP GbE uplink ports can be, for example, 4 or greater.

In some embodiments, the apparatus 100 can be configured to support L2 protocols as well as L3 protocols like Routing Information Protocol (RIP) and static routing in base license. In some embodiments, the apparatus 100 can include an enhanced license for supporting additional L3 protocols such as Open Shortest Path First (OSPF) protocol, Internet Group Management Protocol (IGMP v1/v2/v3), Protocol Independent Multicast (PIM), IEEE 802.1 Q-in-Q, Bidirectional Forwarding Detection (BFD), Virtual Router Redundancy Protocol (VRRP) and Virtual Router/VRF-Lite.

In some embodiments, the apparatus 100 can be configured to support IPv6 management, such as neighbor discovery, telnet, Secure Shell (SSH), Domain Name System (DNS), syslog, and Network Time Protocol (NTP). In some embodiments, the apparatus 100 can include Flexible Forwarding Table (FFT) that allows the hardware table to be divided into configurable partitions of Layer-2 media access control (MAC), Layer-3 host, and longest prefix match (LPM) tables.

In some embodiments, the apparatus 100 can support flow path analysis by responding to application probe packets with probe ingress and egress timestamps and rich network statistics such as ingress interface, hash computed egress interface, queue stats, interface error, bandwidth utilization at ingress, equal-cost multipath (ECMP) group load distribution, and more. The apparatus 100 can also report underlay network path information and overlay tunnel bandwidth utilization on the switch in response to overlay probe packets for overlay and underlay correlation.

In some embodiments, the apparatus 100 can be configured to support a broad set of MPLS features, including L3 VPN, RSVP traffic engineering, and LDP to support standards-based multitenancy and network virtualization with per-flow SLAs at scale. In some embodiments, the apparatus 100 can also be deployed as a low-latency MPLS label-switching router (LSR) or MPLS provider edge (PE) router in smaller scale environments.

In some embodiments, the apparatus 100 can include a Fiber Channel over Ethernet (FCoE) transit switch, which can be configured to provide an IEEE data center bridging (DCB) converged network between FCoE-enabled servers and an FCoE-to-FC gateway or FCoE-enabled Fiber Channel storage area network (SAN). In some embodiments, the apparatus 100 can be configured to offer a full-featured DCB implementation that provides strong monitoring capabilities on the top-of-rack switch for SAN and LAN administration teams to maintain clear separation of management.

In some deployments, the router 20 can be used as a broadband network gateway (BNG). In these deployments, the router 20 can offer high subscriber density and sophisticated broadband edge features available in the industry.

In some deployments, the router 20 can be used as a universal software defined network (SDN) gateway, where the router 20 can be configured for interconnecting virtual and physical networks, as well as between virtual networks operating with different technologies. The interconnection can be realized via, for example, support for Multiprotocol Border Gateway Protocol (MBGP), dynamic tunnels using Multiprotocol Label Switching over generic routing encapsulation (MPLSoGRE) or Virtual Extensible LAN (VXLAN) encapsulation, virtual routing and forwarding (VRF) tables, E-VPNs, and/or Network Configuration Protocol (NETCONF), among others.

In some deployments, the router 20 can be used within a data center and cloud edge network, in which the router 20 can be configured to support multiple overlay encapsulation methods, including VXLAN, Network Virtualization using Generic Routing Encapsulation (NVGRE), Multiprotocol Label Switching over User Datagram Protocol (MPLSoUDP), MPLSoGRE, 802.1BR, segment routing-multiprotocol label switching (SR-MPLS), and segment routing-v6 (SR-V6).

In some deployments, the router 20 can be used in an enterprise Wide Area Network (WAN). Enterprises and government agencies worldwide can use the router 20 to build their own overlay network on top of a service provider's Layer-2 or MPLS network, using encapsulation technologies such as MPLSoGRE, VXLAN, and IPsec for secure transport.

In some deployments, the router 20 can be used for universal metro/aggregation. In these embodiments, the router 20 can be configured to provide a full suite of routing and switching features, allowing users to choose a deployment model that best fits business and technical considerations. The router 20 can be deployed as IP/IP VPN edge routers, Ethernet VPN (EVPN) and virtual private LAN service (VPLS) provider edge (VPLS-PE) routers, MPLS label-switching (LSR) routers, and as Layer-2 Ethernet switches or Layer-3 IP routers.

In some deployments, the router 20 can be used for mobile backhaul. In addition to switching, routing, and security features, the router 20 can be further configured to support highly scalable and reliable hardware-based timing that meets the LTE requirements, including Synchronous Ethernet for frequency and the Precision Time Protocol (PTP) for frequency and phase synchronization.

To facilitate the operation of the router 20 in various applications, the router 20 can include one or more modular components (not shown in FIG. 1). In some embodiments, the router 20 can include Modular Port Concentrators (MPCs), which are configured to provide routing, Multiprotocol Label Switching (MPLS), switching, inline services, subscriber management, and hierarchical quality of service (HQoS), among others. The MPCs can also be configured to host interfaces directly or via Modular Interface Cards (MICs) that allow users to "mix and match" interface types. Powered by a programmable silicon chipset, the MPCs can collect and stream telemetry that identifies resource utilization, loss and delay, and other metrics.

In some implementations, the router 20 can include Switch Control Boards (SCBs) (not shown in FIG. 1), which include an integrated switch fabric that connects to all slots in the chassis (not shown) in a nonblocking architecture. The SCBs can be configured to house the Routing Engine, control power to MPCs, monitor and control system functions such as fan speed and the system front panel, and manage clocking, resets, and boots. The Routing Engine (RE) is usually configured to provide the control plane for the router 20, runs operating systems, and handles all routing protocol processes as well as the software processes that control MPCs, chassis components, system management, and user access to the router.

In some deployments, the router 20 can be used in a metro Ethernet network. In one example, the metro Ethernet network can be used for business services, where the router 20 can be deployed as a Customer Premise Equipment (CPE) or network interface device (NID) to provide Layer 2 or Layer 3 business access, direct Internet access, and IP services such as IP VPN. The router 20 can be configured to provide robust Operation, Administration, and Maintenance (OAM) and service level agreement (SLA) control capabilities, together with automation and zero touch provisioning.

In another example, the metro Ethernet network can include residential aggregation, in which case the router 20 can be employed as a versatile metro aggregation platform. The router 20 can be configured to support high port densities and rich features such as Ethernet OAM for E-LINE, E-LAN, E-TREE over Ethernet or IP/Multiprotocol Label Switching (MPLS), and IP VPN.

In some deployments, the router 20 can be used in wholesale mobile backhaul. In addition to Metro Ethernet Forum Carrier Ethernet (MEF-CE) 2.0 supporting both Ethernet and IP/MPLS, the router 20 can be further configured to provide high capacity and scalability, complete timing and synchronization, and integrated security and SLA tools that wholesale operators can use to differentiate for mobile backhaul services. Additionally, the router 20 can be used as a last-mile deployment solution for a small cell-as-a-service offering.

In some deployments, the router 20 can be used for cloud exchange. In these deployments, the router 20 can be configured to have high capacity, low power consumption, and a rich MEF and IP feature set.

In some deployments, the router 20 can be used for mobile backhaul and fronthaul. The accelerating speed of innovation is forcing mobile operators to start planning for migration to LTE-Advanced (LTE-A) and 5G, which can place more stringent specifications for capacity, latency, synchronization, and security on the network infrastructure. The router 20 can be equipped, for example, with 1 GbE/10 GbE interfaces and provide up to 60 Gbps of throughput. In addition to high capacity and density to address scaling requirements, the router 20 can also address end-user quality requirements through high-precision timing, advanced security features, and enhanced SLA management capabilities.

In some deployments, the router 20 can be configured to support all mobile services profiles including 2G/3G HSPA, 4G LTE, LTE-Advanced, and Small Cell. In a backhaul deployment scenario, the router 20 can be used as a small cell router or a macro cell site router. The backhaul traffic carried over Ethernet or IP/MPLS can be aggregated by the router 20 before the backhaul traffic is delivered to the mobile core. In a C-RAN deployment scenario, the router 20 can be used for fronthaul in a battery backup unit (BBU) model.

In some deployments, the router 20 can be used in an enterprise networking and field area network. Some existing networks are located in demanding and harsh environments, such as the field area networks for providing supervisory control and data acquisition (SCADA) system connectivity. Operators of these networks include power utilities, oil and gas, mining, rail and transportation, and defense and public safety industries. The router 20 can be configured as small-form factor devices delivering comprehensive routing and security services, application awareness and control, with high availability to ensure business continuity and resiliency.

In some implementations, the router 20 can include seamless MPLS capabilities. In some cases, a network can include up to tens of thousands of nodes, the seamless MPLS architecture enables scale and service flexibility by decoupling physical topology for transport and service layers. With a seamless MPLS architecture, service providers can leverage the existing investment of MPLS in the core and edge and extend the operational benefit into the access layer, enabling higher network service flexibility and higher scaling parameters of the MAN where metro Ethernet services can span across multiple network segments and be seamlessly terminated at any point of the network or cloud.

In some implementations, the router 20 can include a management platform that provides comprehensive management with broad fault, configuration, accounting, performance, and security management (FCAPS) capabilities, for both device- and service-level management. For device-level management, the management platform can be configured to support NETCONF, CLI, SNMP v1/v2/v3 protocols, and its APIs can support easy integration with existing network management systems (NMS) and operations/business support systems (OSS/BSS).

In some implementations, the router 20 can include highly scalable and reliable hardware-based timing technology that meets the strictest LTE-A specifications for frequency and phase synchronization. Providing an accurate timing reference can be helpful for deployment of LTE radio access networks. In some embodiments, the router 20 can be configured to support synchronous Ethernet for frequency as well as Precision Time Protocol (PTP) for both frequency and phase synchronization. In some embodiments, the router 20 allows Synchronous Ethernet and PTP to be used in a hybrid mode for the highest level of frequency (e.g., 10 parts per billion or 10 ppb) and phase (e.g. less than 500 ns) accuracy used for LTE-A. In some embodiments, the router 20 can also include an integrated global positioning system (GPS) receiver and can act as a grandmaster (GM) clock for a distributed PTP implementation, thereby facilitating the aggregation of small cell traffic when the backhaul is transported over the Internet.

In some implementations, the router 20 can include advanced security services. For example, the router 20 can implement advanced security services such as IPsec, MACsec, NAT, and TPM to protect against potential vulnerabilities to the network as well as subscriber traffic.

In some implementations, the router 20 can include enhanced service assurance, SLA management, and Ethernet OAM. For example, the router 20 can use 802.3ah, 802.1ag, Y.1731, Two-Way Active Measurement Protocol (TWAMP), and RFC2544.

In some implementations, the router 20 can be temperature hardened and support passive cooling for outdoor deployments in extreme weather conditions. For example, the router 20 can be based on environmentally hardened, ruggedized chassis and are IP65 compliant for outdoor deployments with no need for an enclosure or cabinet.

The first communication interface 110 and the second communication interface 120 (collectively referred to as communication interfaces) can include transceiver-like components (e.g., a transceiver, a separate receiver and transmitter, etc.) that enable the apparatus 100 to communicate with other devices (e.g., the network device 10 and the router 20). The communication can include a wired connection, a wireless connection, or a combination of wired and wireless connections. In some embodiments, the communication interfaces can include an Ethernet interface, an optical interface, a coaxial interface, an infrared interface, a radio frequency (RF) interface, a universal serial bus (USB) interface, a Wi-Fi interface, and/or a cellular network interface, among others.

In some embodiments, the signal generator 130 can include a link layer discovery protocol (LLDP) manager and the Ethernet signal generated by the signal generator 130 can accordingly include an LLDP signal. The information about the optical line 15 can be encapsulated by a set of type-length-values (TLVs) in the LLDP signal. In some embodiments, the Ethernet signal can include a ping packet or an internet control message protocol (ICMP) signal (more details are provided below with reference to FIG. 2).

The Ethernet signal generated by the signal generator 130 can include various types of information about the optical line 15. In some embodiments, the Ethernet signal can include information about the encryption status in the optical line 15. For example, the Ethernet signal may indicate that the optical line 15 is not properly encrypted, in which case the router 20 may stop transmitting any signal back to the apparatus 100 in response to receiving the Ethernet signal. The router 20 may resume data transmission in response to receiving another Ethernet signal from the apparatus 100 indicating that the encryption of the optical line 15 is restored.

In some embodiments, the Ethernet signal can include information about the available bandwidth in the optical line 15. For example, the Ethernet signal may show that the available bandwidth in the optical line 15 decreases, thereby indicating likely packet loss in the optical line 15. In this instance, the router 20 may adjust its operation to address the reduced bandwidth in response to receiving the Ethernet signal. In some deployments, the router 20 can adjust the quality of service (QoS) of traffic transmitted from the router 20 in response to receiving the Ethernet signal. For example, the router 20 can adjust (e.g., reduce) the amount of data transmitted to the optical line 15 by, for example, sending some data to an alternative route if available. The router 20 may also start monitoring the number of sent and received packets between the apparatus 100 and the network device 10 (or increase the frequency of such monitoring) so as to count and record the number of lost packets. In some embodiments, the router 20 can include a controller (not shown in FIG. 1) to count the packets (e.g., sent, received, and lost packets) and re-balance the traffic accordingly.

In some embodiments, the Ethernet signal 130 can include information about the expected latency in the optical line 15. For example, the apparatus 100 and the network device 10 may switch traffic to a different route having a different latency (e.g., due to different path lengths) and the router 20 can be made aware of this switch via the Ethernet signal. When some services that need ultra-low-latency are affected by this switch of route, the router 20 can then quickly identify the cause (i.e., route change) from the Ethernet signal. If the new latency exceeds a configured limit, the router 20 can shut down the link as the link became unusable. In some embodiments, the router 20 is configured to steer traffic with strict latency limits away from that link. In some embodiments, the router 20 is configured to update the latency calculation for all services using that link. The calculated latency for some services may still be within the latency limit, while some other services may have latencies that exceed the limit (shut-down or re-route can then be performed on these services).

In some embodiments, the apparatus 100 and the network device 10 can be connected by a primary route and a secondary route (also referred to as a protection route) (e.g., in a 1:1 scheme). The Ethernet signal can then include information about which route is currently used for optical communication between the apparatus 100 and the network device 10. In the event that Ethernet signal indicates a change of router (e.g., from the primary route to the second route or vice versa), the router 20 may restart the timing because the propagation time within the route may have changed.

In some embodiments, the Ethernet signal can include information about the jitter level in the optical line 15. In the event that the jitter level is greater than a threshold value, the router 20 can depreciate the time resource (sometimes also referred to as clock identifier) in the optical line 15. In some examples, the router 20 can reduce the accuracy of the clock (e.g., using a different clock having a lower accuracy) to perform the depreciation.

In some embodiments, the router 20 can be configured to generate and send a second Ethernet signal (also referred to as a return signal) to the apparatus 100, which can receive the second Ethernet signal using the second communication interface 120. The second Ethernet signal can include information about the router 20. For example, the second Ethernet signal can include information about the status of port usage in the router 20. In general, the apparatus 100 (and/or the network device 10) can measure the amount of packets received, but usually do not know how many packets have been dropped by the router 20 before. For example, the "upstream" router 20 can have a queue which might be full and is dropping data. The apparatus 100 can receive lots of traffic but may not drop data by itself. The network device 10 also receives traffic and does not drop data either. As a result, the network device 10 and the apparatus 100 know that the link is quite full but do not know "how full" it is. By understanding how many packets get dropped in the router 20, the devices 10 and 100 can try to, for example, balance traffic differently. Information about the port usage at router 20 therefore can be used by the apparatus 100 (and/or the network device 10) to prioritize remedial actions in case of failure (or degradation).

In some embodiments, the second Ethernet signal can include information about the timing of the router 20. For example, the router 20 may use SyncE or IEEE1588 protocol for synchronization and timing. Information about the timing protocol can be conveyed to the apparatus 100 (and/or the network device 10) such that internal mechanisms with the apparatus (and/or the network device 10) can be set up to improve timing and additional monitors/telemetry can be enabled.

While various embodiments have been described and illustrated herein, a variety of other means and/or structures for performing the function and/or obtaining the results and/or one or more of the advantages described herein, and each of such variations and/or modifications are possible. More generally, all parameters, dimensions, materials, and configurations described herein are meant to be examples and the actual parameters, dimensions, materials, and/or configurations will depend upon the specific application or applications for which the disclosure is used. It is to be understood that the foregoing embodiments are presented by way of example only and that other embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

As used herein, a "module" can be, for example, any assembly and/or set of operatively-coupled electrical components associated with performing a specific function, and can include, for example, a memory, a processor, electrical traces, optical connectors, software (stored and executing in hardware) and/or the like.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
   receiving, at a router, an Ethernet signal from a first network device that is in an optical network using wavelength-division multiplexing (WDM) scheme and that is configured to communicate with a second network device via an optical line, the Ethernet signal being generated based on an encrypted packet received from the second network device and including a link-layer discovery protocol (LLDP) signal representing a status of an optical line encryption; and
   adjusting an operation of the router in response to receiving the Ethernet signal and receiving the LLDP signal indicating that encryption is disabled on the first network device.

2. The method of claim 1, wherein the first network device includes a network switch.

3. The method of claim 1, wherein the first network device includes a modem.

4. The method of claim 1, wherein the Ethernet signal further including a content and a checksum.

5. The method of claim 1, wherein the LLDP signal further represents available bandwidth in the optical line, and adjusting the operation of the router includes:
   in response to receiving the LLDP signal indicating a bandwidth in the optical line less than an expected value, adjusting a quality of service (QoS) of traffic transmitted from the router.

6. The method of claim 1, wherein adjusting the operation of the router includes:
   in response to receiving the Ethernet signal indicating a jitter level greater than a threshold value, depreciating a time resource in the optical line.

7. The method of claim 1, wherein the LLDP signal further represents expected latency in the optical line.

8. The method of claim 1, further comprising:
   transmitting a second Ethernet signal to the first network device, the second Ethernet signal representing a status of port usage in the router.

9. The method of claim 1, further comprising:
   transmitting a second Ethernet signal to the first network device, the second Ethernet signal representing timing of the router.

10. An apparatus, comprising:
    a first communication interface configured to be communicatively coupled, via an optical line, to a network device that is disposed in an optical network using a wavelength division multiplexing (WDM);
    a second communication interface configured to be communicatively coupled to a router via an Ethernet connection; and
    a signal generator operatively coupled to the first communication interface and the second communication interface, the signal generator configured to generate an Ethernet signal based on an encrypted packet received from the network device, the encrypted packet including a content and a checksum, the second communication interface configured to transmit the Ethernet signal to the router,
    the second communication interface configured to receive a second Ethernet signal transmitted by the router, the second Ethernet signal representing (1) a status of port usage in the router or (2) timing of the router.

11. The apparatus of claim 10, wherein the network device includes a network switch.

12. The apparatus of claim 10, wherein the network device includes a modem.

13. The apparatus of claim 10, wherein the signal generator is configured to generate the Ethernet signal including a link-layer discovery protocol (LLDP) signal representing a status of an optical line encryption, the Ethernet signal being generated by decrypting the content and not decrypting the checksum.

14. The apparatus of claim 10, wherein the signal generator is configured to generate the Ethernet signal including an LLDP signal representing available bandwidth in the optical line.

15. The apparatus of claim 10, wherein the signal generator is configured to generate the Ethernet signal including an LLDP signal representing expected latency in the optical line.

16. The apparatus of claim 10, wherein the optical line includes a primary route and a secondary route, and the Ethernet signal including an LLDP signal representing a selection of route between the primary route and the second route used for optical communication between the first communication interface and the network device.

17. The apparatus of claim 10, wherein the Ethernet signal including information about at least one attribute of the optical line between the first communication interface and the network device.

18. The apparatus of claim 10, wherein the Ethernet signal indicates a jitter level.

19. A system, comprising:
    a first network switch;
    a second network switch communicatively coupled to the first network switch via an optical line using wavelength division multiplexing (WDM); and
    a router communicatively coupled to the first network switch via an Ethernet connection,
    the first network switch configured to generate a link-layer discovery protocol (LLDP) signal representing an encryption status of the optical line between the first network device and the second network device, the LLDP signal being generated based on an encrypted packet received from the second network switch, in response to receiving the LLDP signal indicating that encryption is disabled on the first network device.

20. The system of claim 19, wherein:
at least one of the first network switch or the second network switch is configured to represent the encryption status of the optical line and send the LLDP signal in response to representing the encryption status of the optical line.

* * * * *